(12) United States Patent
Van De Sluis et al.

(10) Patent No.: US 12,270,526 B2
(45) Date of Patent: Apr. 8, 2025

(54) LIGHTING DEVICE COMPRISING A LUMINOUS PANEL AND A POWER TRACK

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Leendert Teunis Rozendaal, Valkenswaard (NL); Michel Cornelis Josphus Marie Vissenberg, Roermond (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 89 days.

(21) Appl. No.: 18/270,901

(22) PCT Filed: Dec. 22, 2021

(86) PCT No.: PCT/EP2021/087393
§ 371 (c)(1),
(2) Date: Jul. 5, 2023

(87) PCT Pub. No.: WO2022/148665
PCT Pub. Date: Jul. 14, 2022

(65) Prior Publication Data
US 2024/0068633 A1 Feb. 29, 2024

(30) Foreign Application Priority Data

Jan. 8, 2021 (EP) .................... 21150645

(51) Int. Cl.
*F21S 8/00* (2006.01)
*F21S 8/04* (2006.01)
(Continued)

(52) U.S. Cl.
CPC .............. *F21S 8/036* (2013.01); *F21S 8/038* (2013.01); *F21S 8/04* (2013.01); *F21V 21/35* (2013.01);
(Continued)

(58) Field of Classification Search
CPC .... F21S 8/036; F21S 8/038; F21S 8/06; F21S 8/046; F21S 10/023; F21V 21/35;
(Continued)

(56) References Cited

U.S. PATENT DOCUMENTS 5,251,392 A * 10/1993 McManigal ............ G09F 27/00
40/442
6,739,740 B1 5/2004 Feldman
(Continued)

FOREIGN PATENT DOCUMENTS

DE 202017107237 U1 2/2018
DE 202018106507 U1 11/2018
(Continued)

OTHER PUBLICATIONS

Beecken S, Assembly for General Lighting and Method for Controlling Such an Assembly, Sep. 12, 2018, English Text of EP 3172483 B1. (Year: 2018).*

*Primary Examiner* — Alan B Cariaso

(57) ABSTRACT

The present invention relates to a lighting device (1) comprising a luminous panel (2) comprising a light-emitting surface (3), a cover surface (4) arranged at a distance from the light-emitting surface (3), and at least one lateral surface
(Continued)

(5) connecting the light-emitting surface (3) and the cover surface (4). The lighting device (1) further comprises a power track (6) being integrated in the luminous panel (2).

13 Claims, 4 Drawing Sheets

(51) Int. Cl.
*F21S 8/06* (2006.01)
*F21V 21/35* (2006.01)
*F21Y 105/00* (2016.01)
*F21Y 113/20* (2016.01)
*F21Y 115/10* (2016.01)
*F21V 8/00* (2006.01)

(52) U.S. Cl.
CPC .............. *F21S 8/06* (2013.01); *F21Y 2105/00* (2013.01); *F21Y 2115/10* (2016.08); *G02B 6/0083* (2013.01)

(58) Field of Classification Search
CPC .............. F21Y 2115/10; F21Y 2105/00; F21Y 2113/20; G02B 6/0083
See application file for complete search history.

(56) References Cited

U.S. PATENT DOCUMENTS

| | | | |
|---|---|---|---|
| 7,784,204 B2 * | 8/2010 | Staats | F21S 8/037 |
| | | | 362/125 |
| 9,341,387 B2 * | 5/2016 | Cursetjee | F24F 13/078 |
| 9,841,153 B2 * | 12/2017 | Pearson | F21V 21/088 |
| 2007/0217192 A1 | 9/2007 | Hiratsuka | |
| 2008/0037284 A1 | 2/2008 | Rudisill | |
| 2014/0347880 A1 | 11/2014 | Kuo et al. | |
| 2014/0355248 A1 | 12/2014 | Cursetjee et al. | |
| 2017/0082266 A1 | 3/2017 | Ruhland et al. | |

FOREIGN PATENT DOCUMENTS

| | | | | |
|---|---|---|---|---|
| DE | 102018122361 A1 | | 3/2020 | |
| EP | 3172483 B1 | * | 9/2018 | F21S 10/00 |
| JP | 2009259550 A | | 11/2009 | |
| JP | 2012215050 A | | 11/2012 | |
| WO | 2017121430 A1 | | 7/2017 | |

\* cited by examiner

LIGHTING DEVICE COMPRISING A LUMINOUS PANEL AND A POWER TRACK

CROSS-REFERENCE TO PRIOR APPLICATIONS

This application is the U.S. National Phase application under 35 U.S.C. § 371 of International Application No. PCT/EP2021/087393, filed on Dec. 22, 2021, which claims the benefit of European Patent Application No. 21150645.6, filed on Jan. 8, 2021. These applications are hereby incorporated by reference herein.

TECHNICAL FIELD

The present invention relates to a lighting device comprising a luminous panel and a power track being integrated in the luminous panel. Further, the present invention relates to a lighting assembly comprising at least two such lighting devices, and to a method for controlling such a lighting device.

BACKGROUND

Setting a correct light in an interior environment is of large importance. First of all, a correctly illuminated room is perceived by the user as attractive and pleasant to reside. Thus, in a department store, the light setting may be used for putting accent on a product shelf, while creating a pleasant background illumination. In a home environment, it may be desirable to illuminate a particular spot in a room, such as a painting or a plant, while the rest of the room may be illuminated by a diffuse uniform light.

Further, the correct light setting may be important for health aspects of the user, especially during the winter time at northern latitudes. In particular, it is desirable to mimic natural day light, wherein direct light from the Sun is combined with scattered light from the sky as well as the surrounding objects.

A lighting system used in an interior environment should be highly adaptable, giving the user possibility to control different parts of the lighting system independently, such that the light setting may be adapted to a current situation. For instance, the user may want to depower, dim and/or redirect different parts of the lighting system, or to add or remove components.

Currently available lighting systems related to some of the aspects above normally combine a main light source providing a diffuse background light with one or more secondary light sources, such as spotlights. Indeed, such lighting systems provide some of the feature mentioned above. However, the lighting systems of the prior art suffer from poor flexibility and adaptability, since these systems usually provide the secondary light sources being arranged at pre-defined positions. Moreover, once such a lighting system has been installed, it is virtually impossible to add or remove components.

SUMMARY

The object of the present invention is to eliminate or at least remedy the above mentioned problems. To this end, the present invention provides a lighting device comprising a luminous panel comprising a light-emitting surface, a cover surface arranged at a distance from the light-emitting surface, and at least one lateral surface connecting the light-emitting surface and the cover surface. The lighting device further comprises a power track being integrated in the luminous panel.

The luminous panel of the present invention may be of any type known in the art. The light-emitting surface of the luminous panel is the surface arranged for emitting light, preferably diffused white light. The cover surface is arranged at a distance from the light-emitting surface and may be substantially parallel to the light emitting surface. The cover surface is arranged for attaching the lighting device to a mounting surface, such as a ceiling or a wall. The lighting device may be suspended from the mounting surface by means of a suspending member, such as a wire, a cable, a chain or the like. The length of such a suspending member may be adapted to the intended use and may be from 0.2 m to 1 m. Alternatively, the lighting device of the present invention may be attached to the mounting surface by fastening means, such as adhesive, screw, bolt or the like.

The lighting device of the present invention may comprise a mounting member arranged on the cover surface of the luminous panel. The mounting member may be attached to the cover surface by any suitable means known in the art, such as adhesive, weld, screw, bolt or the like. Thus, the lighting device may be attached to the mounting surface via the mounting member, such that the mounting member is arranged between the cover surface of the lighting device and the mounting surface. The size and shape of the mounting member may be substantially identical to the size and shape of the cover surface. Preferably, the shape of the mounting member corresponds to the shape of the cover surface, while the size of the mounting member is smaller that the size of the cover surface. In such an embodiment, the mounting member is hidden from view, at the same time providing sufficient attachment strength.

The cover surface is preferably manufactured of a light-impermeable material on order to avoid light leakage. A material suitable for the cover surface is aluminum, having the advantage of light weight and appealing appearance. The mounting member may be manufactured of any material having sufficient strength and durability, such as aluminum. Preferably, both the cover surface and the mounting member are manufactured from the same material in order to obtain an aesthetically appealing lighting device.

It should be noted that the size and shape of the light-emitting surface is preferably the same as the size and shape of the cover surface. However, the size and shape of the light-emitting surface may be different from the size and shape of the cover surface.

The luminous panel of the lighting device according to the present invention may comprise a plurality of 2D LED light sources. The LED light sources may be of any type known to a person skilled in the art. In particular, the LED light sources may be high brightness LED chips, with a luminous flux of 8-12 lumen per source. The LED light sources may be arranged along the edge portions of a LED PCB board.

The luminous panel of the present invention may comprise a light guide plate (LGP). The LGP may comprise on optical material, which may be made of PMMA, in order to provide a bright homogeneous soft lighting after the LEDs are connect to a power supply.

The luminous panel may comprise a diffusing layer arranged in front of the LGP. The diffusing layer may be rigid or flexible and may be arranged in order to make the light distribution more uniform.

At the back of the LGP, a reflector plate may be arranged. The reflector plate may utilize a reflective (and diffusing) material arranged to provide a strong reflective effect.

As mentioned above, the luminous panel of the lighting device according to the present invention further comprises at least one lateral surface connecting the light-emitting surface and the cover surface. The lateral surface may be substantially perpendicular to the light-emitting surface and the cover surface. The lateral surface of the luminous panel may be in the form of an aluminum frame, providing light weight and neat design while avoiding light leakage. The extension of the lateral surface between the cover surface and the light-emitting surface may be from 0.5 to 20 cm, preferably from 1 to 5 cm.

The luminous panel may be of any suitable shape and size. Thus, the luminous panel may be circular, triangular, rectangular or polygonal. Preferably, the luminous panel is substantially rectangular and comprises two longitudinal lateral surfaces and two transversal lateral surfaces. The area of the luminous panel may be from 0.04 $m^2$ to 50 $m^2$. In other words, the luminous panel of the present invention may be used as a small mood lighting as well as a major light source covering substantially entire ceiling of a room. The area of the luminous panel should not exceed the value at which the luminous panel becomes difficult to handle and install and loses its structural integrity.

The luminous panel may be automatically controlled, such the light settings of the luminous panel is adapted to the ambient light. By the term "light setting" is understood wavelength and intensity of the light emitted by the luminous panel. Additionally, or alternatively, the luminous panel may be manually controlled, such that the user may determine the light settings.

According to the present invention, a power track is integrated in the luminous panel. By the term "integrated" is meant "combined to form a single unit". In other words, the power track is arranged on or in the luminous panel such that the luminous panel and the power track form a single unit in the form of the lighting device. The lighting device of the present invention thus provides flexibility of arranging one or several auxiliary devices on the luminous panel by connecting such auxiliary devices to the power track. The user may thus determine whether such auxiliary devices are needed, and if so, at what position.

The lighting device of the present invention may be mounted on a ceiling, either by suspending or by attaching, such that the cover surface faces the ceiling and the light-emitting surface is facing away from the ceiling. Moreover, the lighting device may be mounted on wall, such that the cover surface faces the wall, and the light-emitting surface is facing away from the wall. The lighting device of the present invention may be standing on a floor, such that the cover surface and the light-emitting surface are perpendicular to the floor. Such an embodiment may be used for a presentation backwall or a desk divider with a power track integrated in the top side, enabling a user to add auxiliary devices such as spotlights, sensors, loudspeakers or other electronic devices.

The power track is arranged to provide electric output. The power track according to the present invention may be automatically or manually controlled. The automatic control may be dependent on the light settings of the luminous panel according to the above. In other words, the light settings of the luminous panel may determine whether the power track will provide electric output, and if so, of what magnitude.

According to the present invention, the power track may be integrated along at least a portion of the at least one lateral surface. Thus, the power track may be integrated along the entire perimeter of the luminous panel, along one lateral surface, or along a portion of one lateral surface. When the luminous panel covers substantially the entire ceiling, it may be desirable to arrange the power track along the entire perimeter of the lateral surface of the luminous panel, such that auxiliary devices in the form of light sources may be connected to the power track in order to accent the walls, as will be described in greater detail below.

As mentioned above, the luminous panel may be substantially rectangular and may comprise two longitudinal lateral surfaces and two transversal lateral surfaces. In such an embodiment, the power track is preferably integrated in at least one of the two longitudinal lateral surfaces, more preferably in both of the longitudinal lateral surfaces.

Additionally, or alternatively, the power track may be integrated along at least a portion of the cover surface. Such an embodiment provides the advantage of hiding the power track from the normal field of view of the user. Preferably, the power track is integrated along the peripheral portion of the cover surface, such that the power track is easily accessible when installing or removing auxiliary devices.

Preferably, the light-emitting surface of the luminous panel is free from the power track, such that the light emitted by the light-emitting surface of the luminous panel is not disturbed. In addition, the power track should not be positioned substantially in the light path, i.e. the space between auxiliary devices in the form of light sources and the light-emitting surface of the luminous panel such that the light output of the luminous panel is not disturbed.

If the lighting device comprises a mounting member as described above, the power track may be integrated in at least a portion of the mounting member. Such an embodiment is advantageous when it is desired to hide the power track from view.

At least a portion of the lateral surface of the luminous panel according to the present invention may comprise a cavity. The cavity may extend along the entire lateral surface and may be cylindric, rectangular, pyramidal, trapezoidal or the like. The power track may be integrated inside the cavity. Such an embodiment provides the advantage of a discrete arrangement of the power track and the auxiliary devices connected to the power track. The cavity may be dimensioned such that the auxiliary device connected to the power track is arranged inside the cavity. Further, when the auxiliary device is a light source, such as a spotlight, the cavity may also have beam shaping properties.

In order to minimize interference between the light emitted by the light-emitting surface of the luminous panel and the auxiliary devices connected to the power track, the cavity may comprise an upper edge and a lower edge, wherein the lower edge of the cavity may be slanted. The term "upper edge" refers to the edge between the lateral surface and the cover surface, and the term "lower edge" refers to the edge between the lateral surface and the light-emitting surface. In such an embodiment, the auxiliary devices connected to the power track are well hidden from view, and the light that may be emitted by the auxiliary devices is directed away from the light emitted by the light-emitting surface of the luminous panel.

The at least one lateral surface of the luminous panel may comprise an upper portion and a lower portion. By the term "upper portion" is meant a portion of the lateral surface being arranged in proximity of the cover surface, while the term "lower portion" means the portion of the lateral surface being arranged in proximity of the light-emitting surface. An additional aspect that may further prevent interference between the light emitted by the light-emitting surface of the luminous panel and the auxiliary devices connected to the power track is arranging the cavity in the upper portion of the at least one lateral surface.

As has been mentioned previously, the power track of the lighting device according to the present invention may be arranged for connecting at least one auxiliary device. Such an auxiliary device may be a light source, e.g. a spotlight, a sensor or a multi-sensor, a thermometer, a loudspeaker, a camera or the like. The auxiliary light source may be a light source providing visible light or disinfecting UV light.

In a particularly preferred embodiment, the auxiliary device is a spotlight, giving the user a possibility to customize the lighting device of the present invention. Thus, the user may install the luminous panel in a room, subsequently adding or removing spotlights depending on the user's personal taste and/or the interior in the room. The user may want to illuminate a particular detail of the interior, such as a dinner table, a reading chair, a painting or a plant. The user may thus easily connect the required number of spotlights to the power track at exact positions. Should the interior of the room change, e.g. by adding a piece of furniture or redecoration of the room, the spotlights may be easily rearranged along the power track or removed if not needed. It is thus evident that the lighting device of the present invention provides an unprecedented flexibility.

The power track may be arranged such that it is almost not visible to the user, e.g. by arranging the power track in a cavity or in a mounting member, as described above. However, it may be desirable to hide the power track completely. To this end, the lighting device according to the present invention may comprise a cover element being connectable to the power track. The cover element may be designed such that it resembles the surface in which the power track is arranged, e.g. the lateral surface or the cover surface of the luminous panel. Once connected to the power track, the cover element will thus completely or partly camouflage the power track. Alternatively, the cover element may comprise at least one light source, such as a LED light source. When such a cover element is connected to the power track, it will provide additional light to the light emitted by the light-emitting surface of the luminous panel. The cover element may be in the form of a strip. The strip may be easily adjusted to the desired length, e.g. by cutting it or by providing a retractable strip comprising a telescopic structure.

As mentioned above, the lighting device according to the present invention may comprise a control unit. The control unit may be used for automatic and/or manual control of the luminous panel and the power track. The light settings of the luminous panel may automatically adjust to the ambient light or be controlled be a timer. Alternatively, or additionally, the luminous panel may be manually controlled by the user, allowing to adjust the light settings of the luminous panel according to the user's requirements. The electric output to the power track may be controlled independently from the luminous panel or may be dependent on the light setting of the luminous panel. In particular, when the luminous panel is depowered, the electric output to the power track may be decreased, for instance dimming the spotlights. In another embodiment, it may be desirable to switch on the power track when the luminous panel is depowered, for instance when a camera needs to be activated after the main light has been switched off. According to the present invention, the power track may comprise a plurality of segments that may be controlled individually and independently from each other. By the term "plurality" is understood "two or more". Such an embodiment allows combining both of the examples above, i.e. depowering the luminous panel leads to a reduced electric output to one segment of the power track, thus dimming the spotlights, and to switching on another segment of the power track, thus activating a camera.

Apart from two power electrodes, the power track may also have a data line or other RF or optical wireless communication means to communicate the state and/or setting of the luminous panel to the auxiliary devices. This also enables individual control of each of the auxiliary devices.

Also, it may be desirable to control the lighting device of the present invention such that the luminous panel emits light having a first wavelength, while the auxiliary device in the of spotlight emits light having a second wavelength. The first and the second wavelengths may provide light of different colours or may provide visible light and UV light. Finally, the auxiliary devices connected to the power track may be spatially controlled, i.e. redirectable. This is particularly relevant when the auxiliary device is a spotlight emitting a beam of light which may need to be redirected depending on the user's demands.

When a large area needs to be illuminated by the lighting device of the present invention, the maximum area of one luminous panel may be insufficient. In such a case, a lighting assembly may be used, comprising at least two lighting devices, each of the lighting devices comprising a luminous panel comprising a light-emitting surface, a cover surface being arranged at a distance from the light-emitting surface, at least one lateral surface connecting the light-emitting surface and the cover surface, and a power track being integrated in the luminous panel. The power track of one of the at least two lighting devices is connected to the power track of the other of the at least two lighting devices. Such a connection may be provided by means of a tongue and groove structure. In such an embodiment, it is sufficient to connect one of the lighting devices to a main power source, while the remaining lighting devices will receive voltage from the plugged lighting device through the power tracks. The lighting assembly has improved structural integrity since the luminous panels connected to each other by means of the power tracks will provide mechanical support to the lighting assembly.

Finally, the present invention relates to a method for controlling a lighting device comprising a luminous panel comprising a light-emitting surface, a cover surface arranged at a distance the light-emitting surface, at least one lateral surface connecting the light-emitting surface and the cover surface, and a power track being integrated in the luminous panel, the method comprising the steps of:

a) receiving current light settings of the luminous panel;
b) controlling output to the power track based on the current light settings of the luminous panel.

The light settings received in step a) may be wavelength and/or intensity of light emitted by the luminous panel. During step b), the power track may be switched on or off, or the output voltage to the power track may be increased or decreased. At least one of steps a) and b) above may be performed automatically by a control unit. Thus, the method of the present invention provides a highly flexible control of the lighting device.

BRIEF DESCRIPTION OF THE DRAWINGS

Embodiments of the invention will now be described by way of example with reference to the accompanying drawings, of which.

Figure 1:
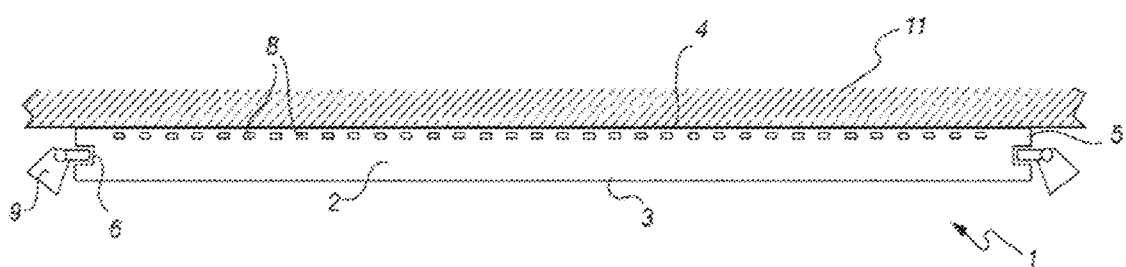
FIG. 1 is a side view of the lighting device of the present invention being attached to a ceiling.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 illustrates a lighting device 1 comprising a rectangular luminous panel 2 comprising a light-emitting surface 3, a cover surface 4 being substantially parallel to the light-emitting surface 3, and two longitudinal lateral surfaces 5 being perpendicular to the light-emitting surface 3 and the cover surface 4. The lighting device 1 further comprises a power track 6 being integrated in the luminous panel 2.

As may be seen in FIG. 1, the lighting device 1 of the present invention is attached to a ceiling 11. The luminous panel 2 of the lighting device 1 comprises a plurality of 2D LED light sources 8. A power track 6 is integrated in the longitudinal lateral surfaces 5 of the luminous panel 2. Further, two auxiliary devices in the form of spotlights 9 are connected to the power track 6. As mentioned above, the auxiliary devices 9 may be removed or repositioned, and further auxiliary devices may be connected to the power track 6 of the luminous panel by connecting such auxiliary devices to the power track 6.

Figure 2:
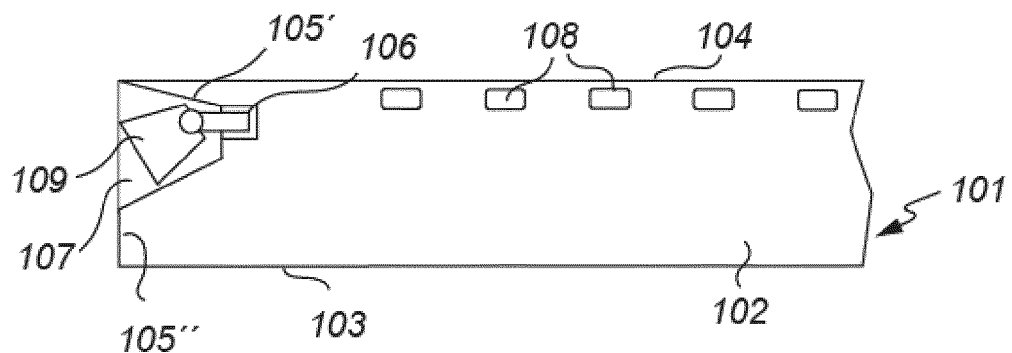
FIG. 2 is a side view of the lighting device of the present invention comprising a cavity.

FIG. 2 depicts a lighting device 101 comprising a rectangular luminous panel 102 comprising a light-emitting surface 103, a cover surface 104 being substantially parallel to the light-emitting surface 103, and one longitudinal lateral surface 105 being perpendicular to the light-emitting surface 103 and the cover surface 104. The lighting device 101 further comprises a power track 106 being integrated in the luminous panel 102. The luminous panel 102 of the lighting device 101 comprises a plurality of 2D LED light sources 108.

As may be seen in FIG. 2, the longitudinal lateral surface 105 comprises an upper portion 105' and a lower portion 105". A trapezoidal cavity 107 extends along the entire upper portion 105' of the longitudinal lateral surface 105. A power track 106 and an auxiliary device 109 are arranged inside the cavity 107. Such an embodiment provides the advantage of a discrete arrangement of the power track 106 and the auxiliary device 109 connected to the power track 106. Further, the cavity 106 also has beam shaping properties, providing a focused beam of light emitted by the auxiliary light source 109.

Figure 3:
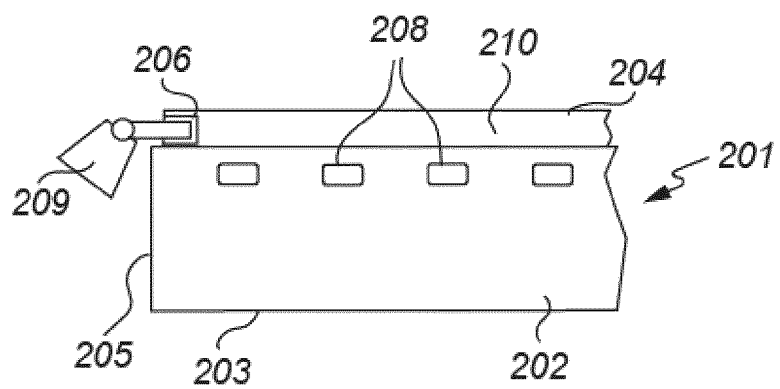
FIG. 3 is a side view of the lighting device of the present invention, wherein the power track is integrated in the mounting member.

FIG. 3 shows a lighting device 201 comprising a rectangular luminous panel 202 comprising a light-emitting surface 203, a cover surface 204 being substantially parallel to the light-emitting surface 203, and one longitudinal lateral surface 205 being perpendicular to the light-emitting surface 203 and the cover surface 204. The luminous panel 202 of the lighting device 201 comprises a plurality of 2D LED light sources 208.

As may be seen in FIG. 3, the lighting device 201 further comprises a mounting member 210 arranged on the cover surface 204 of the luminous panel 202. The shape of the mounting member 210 corresponds to the shape of the cover surface 204, while the size of the mounting member 210 is slightly smaller than the size of the cover surface 204.

A power track 206 is integrated in the mounting member 210, and an auxiliary device 209 is connected to the power track 206. By such an arrangement, the power track 206 is well hidden from view.

Figure 4:
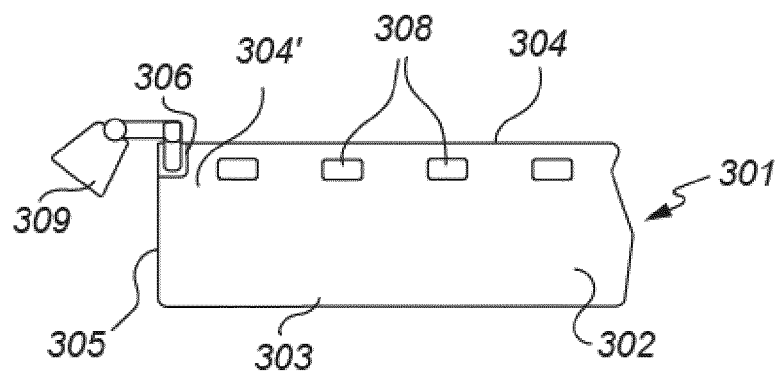
FIG. 4 is a side view of the lighting device of the present invention, wherein the power track is integrated in the peripheral portion of the cover surface.

FIG. 4 illustrates yet another embodiment of the present invention, wherein it is desirable to hide the power track from view. To this end, a lighting device 301 is provided, comprising a rectangular luminous panel 302 comprising a light-emitting surface 303, a cover surface 304 being substantially parallel to the light-emitting surface 303, and one longitudinal lateral surface 305 being perpendicular to the light-emitting surface 303 and the cover surface 304. The luminous panel 302 of the lighting device 301 comprises a plurality of 2D LED light sources 308.

As may be seen in FIG. 4, a power track 306 is integrated along the peripheral portion 304' of the cover surface 304, and an auxiliary device 309 is connected to the power track 306. In such an embodiment, the power track 306 is hidden from view, while being easily accessible when installing or removing auxiliary devices.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising:
a luminous panel comprising a light-emitting surface, a cover surface being arranged at a distance from said light-emitting surface, and at least one lateral surface connecting said light-emitting surface and said cover surface, at least a portion of said lateral surface comprising a cavity,
wherein said lighting device further comprises a power track being integrated inside said cavity, and at least one auxiliary device in the form of a spotlight being connectable to said power track, wherein the cavity has beam shaping properties to provide a focused beam of light emitted by the spotlight.

2. The lighting device according to claim 1, wherein said power track is integrated along at least a portion of said at least one lateral surface.

3. The lighting device according to claim 1, wherein said power track is integrated along at least a portion of said cover surface.

4. The lighting device according to claim 1, wherein said cavity comprises an upper edge and a lower edge, and wherein said lower edge of said cavity is slanted.

5. The lighting device according to claim 1, wherein said at least one lateral surface comprises an upper portion and a lower portion, and wherein said cavity is arranged in said upper portion of said at least one lateral surface.

6. The lighting device according to claim 1, wherein said luminous panel comprises a plurality of 2D LED light sources.

7. The lighting device according to claim 1, wherein said luminous panel is substantially rectangular and comprises two longitudinal lateral surfaces and two transversal lateral surfaces, wherein said power track is integrated in at least one of said two longitudinal lateral surfaces.

8. The lighting device according to claim 1, wherein said lighting device further comprises a mounting member arranged on said cover surface.

9. The lighting device according to claim 1, wherein said lighting device further comprises a cover element being connectable to said power track.

10. The lighting device according to claim 1, wherein said lighting device further comprises a control unit.

11. The lighting device according to claim 1, wherein said power track comprises a plurality of segments.

12. A method for controlling a lighting device according to claim 1, said method comprising the steps of:
   receiving current light settings of said luminous panel; and,
   controlling output to said power track based on said current light settings of said luminous panel.

13. The lighting device according to claim 10, wherein said control unit independently controls the light output of the spotlight and of the luminous panel.

* * * * *